Figure 1:
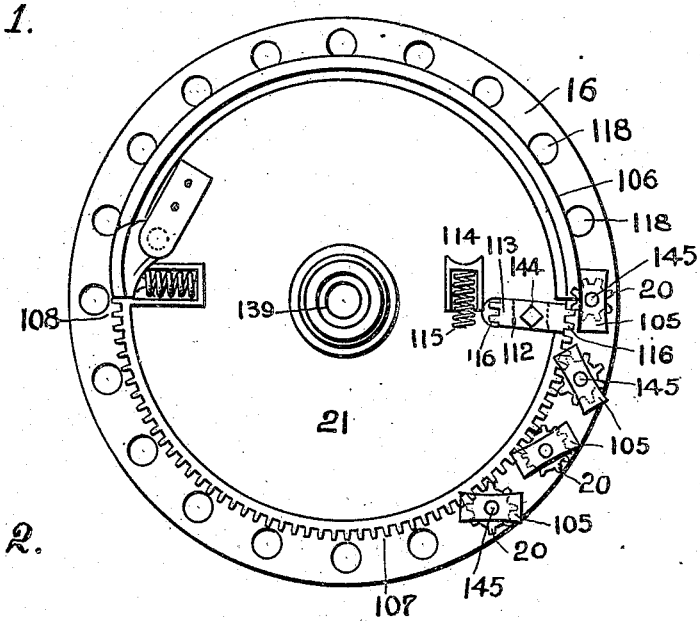

R. C. SCHERLING.
GEARING FOR COTTON HARVESTERS.
APPLICATION FILED DEC. 30, 1908.

921,008.

Patented May 11, 1909.

Witnesses:
C. B. Knudsen
A. G. Peterson

Inventor:
Rudolph C. Scherling
By Michael J. Stark & Sons,
Attorneys.

UNITED STATES PATENT OFFICE.

RUDOLPH C. SCHERLING, OF CHICAGO, ILLINOIS, ASSIGNOR TO HENRY E. BULLOCK AND JAMES E. BULLOCK, OF CHICAGO, ILLINOIS.

GEARING FOR COTTON-HARVESTERS.

No. 921,008.      Specification of Letters Patent.      Patented May 11, 1909.

Application filed December 30, 1908. Serial No. 469,958.

*To all whom it may concern:*

Be it known that I, RUDOLPH C. SCHERLING, a citizen of the United States, and resident of Chicago, in the county of Cook and State of Illinois, have invented certain new and useful Improvements in Gearing for Cotton-Harvesters; and I do hereby declare that the following description of my said invention, taken in connection with the accompanying sheet of drawings, forms a full, clear, and exact specification, which will enable others skilled in the art to which it appertains to make and use the same.

This invention has general reference to gearing; and it consists, essentially, in the novel and peculiar combination of parts and details of construction as hereinafter first fully set forth and described and then pointed out in the claims.

The object of this invention is the production of a gearing, which while applicable in many instances, such as printing presses, mangles etc., is especially designed for use in cotton harvesters where a series of intermittently-revolving picking spindles mounted in columns located in a continuously-revolving cylinder or cage, are operated by a mutilated gear-wheel in conjunction with pinions engaging said gear-wheel. In this class of gearing the mutilated spur-wheel remains stationary while the pinion or pinions revolve around the same while also revolving around their own axis. When these pinions revolve around the mutilated part of the spur-wheel, that is to say, that part thereof that has no gear-teeth, they remain idle, but as soon as they reach the toothed portion, the teeth of the pinions engage the teeth of the spur-wheel and then begin to revolve around their own axis while revolving around the spur-wheel. In reaching the toothed segment or section of the spur-wheel, these pinions strike the first tooth of the toothed segment with considerable force depending upon the speed with which the pinions travel around the spur-wheel, owing to their inertia, and the resistance offered by the mechanism which the pinions are designed to rotate when at rest. This impact is in the nature of a blow and causes frequent breakage of the first few teeth in the segment, especially so after the mechanism has been in operation for some time and the metal has been crystallized by the repeated blows which the cogs have received while in operation. To avoid this breakage to a very considerable extent and to provide for ready and immediate means for repairing any breakage in these first of the series of teeth with but little loss of time, I construct this gearing as shown in the drawings already referred to, in which—

Figure 2:
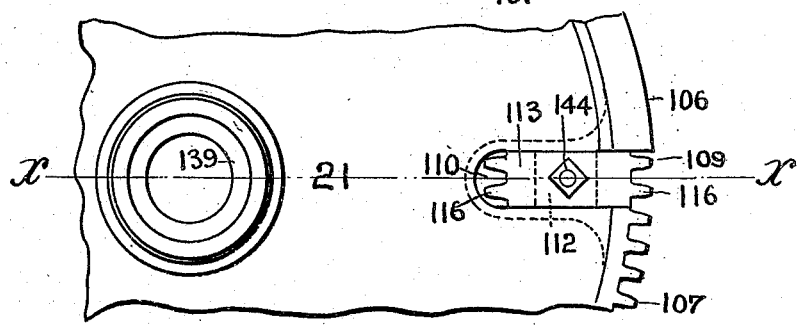
Figure 3:
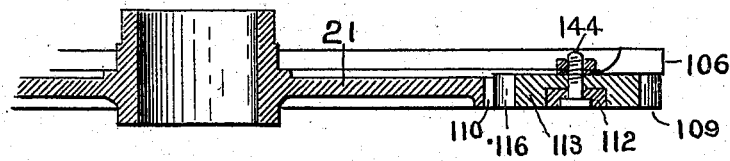

Figure 1 is a plan of this gearing as used in cotton harvesters. Fig. 2 is a plan of a portion of the gear-wheel drawn on an enlarged scale. Fig. 3 is a sectional view of the same on line *x x* of Fig. 2, like parts being designated by corresponding symbols of reference in all the figures.

In the drawings the reference numeral 16 designates one of the heads of the revolving cylinder of a cotton harvester of the type heretofore described, and within which the usual columns carrying the picking spindles are mounted by their trunnions engaging bearings 118, in said cylinder-heads or disks 16, there being in the present instance twenty of these bearings in the cylinder-head. In these columns, not shown, there is in each a shaft 145, upon the end of which the pinions 20 are secured. On the face of the cylinder-head 16, and mounted upon a hollow boss 139 thereon, there is located the mutilated gear-wheel 21, which in the present instance is stationary but yieldingly arranged in the machine by a spiral spring 115 located in a pocket 114 on the face of the gear-wheel 21 which spring abuts against a stationary object on the machine so as to absorb, in part, or offer a yielding resistance to, the impact of the pinions 20 when striking the gear section 107 of the gear-wheel 21. This gear-wheel has cogs on but a part of its periphery so that an intermittent revolution is imparted to the pinions, the remainder of the periphery of the gear-wheel being an externally-smooth rim 106, which projects from the plane of the face of the teeth, as clearly shown in Fig. 3. When the pinions 20 reach the beginning 109 of the tooth-segment they strike with their cogs the first tooth 109 with considerable force and frequent breakage of this, and often several succeeding teeth is the result. In order to avoid this breakage as much as possible and to provide for ready means for repairing or replacing a broken tooth on the gear-wheel I form therein at the beginning of the tooth-section an opening 110, leaving, however, a bridge 112 in said opening, and locate in this opening a block 113, of a width corresponding with a multiple of the pitch-distance of the cogs, this width being in this instance that of three pitch-distances so as to include two full teeth and two half-spaces. This block 113 has on both of its ends gear-teeth 116, and it is secured in the opening 110 and to the bridge 112 by a bolt 144, which bolt is located exactly in the middle of said block so that by reversing the block 113 the teeth of the respective end thereof will coincide with those in the gear-wheel and form, as it were, an integral part thereof. This block 113 I prefer to make in hardened steel so that the teeth thereon will be very strong, but should a tooth in the block be broken, the block can be quickly removed and reversed so as to bring the cogs of the opposite end into service. I prefer to make this block of considerable length so as to provide for long bearing surfaces at the sides of the opening 110 which also receive the impact when the pinions strike the first tooth in said block. The introduction of this removable and reversible block into the gear-wheel of a cotton harvester has resulted in reducing the breakage of gear-teeth to a minimum and the time for making repairs to but a few minutes thereby saving the objectionable and costly delay in the harvesting of the cotton which has heretofore been a drawback to the successful machine-picking of cotton.

In order to locate the pinions properly so that when they reach the first tooth in the toothed section their own teeth will be in proper position for intermeshing with the latter, there are formed on these pinions, preferably integral therewith, slides 105, which, as the cylinder-head revolves, slide upon the peripherally-smooth rim-section 106, which extends from the last to the first teeth of the tooth-section, thereby preventing the pinions from revolving and preserving their correct position while idle so that they may properly engage the toothed section 107 as soon as they reach the same.

I have heretofore stated that there are twenty pinions in the train of gearing so that for every revolution of the cylinder the respective cog in the pinion receives but one impact while the first tooth in the spur-gear receives twenty blows and therefore much sooner deteriorates than the pinions which I prefer to make from a very high grade of malleable metal, for obvious reasons.

While I have heretofore described this device with special reference to its use in cotton harvesters, and have shown but one insert in the spur-wheel, I desire to to be distinctly understood that I do not confine myself to this use exclusively, as a matter of fact a mutilated gear-wheel employed in other machinery is subject to breakage of the first tooth in the toothed section just as much as when used in a cotton harvester, and the introduction of my removable and reversible tooth-section therein a decided improvement. Nor do I wish to confine the employment of this improvement in mutilated gears only since it is also applicable in all instances where a section or part of a complete gear-wheel is subject to severe impacts at a particular spot or spots therein and where the introduction of one or more of the improved removable and reversible tooth-sections will avoid frequent breakage and serious damages.

Having thus fully described this invention, I claim as new and desire to secure to me by Letters Patent of the United States—

1. A spur-wheel, there being in its rim and in the web adjacent to the rim an excision; a bar in said excision, and means for removably fastening said bar in said excision; there being on the outer end of said bar a multiplicity of gear-teeth having spaced relation with the teeth of said gear-wheel and forming a continuation thereof, the part of the bar beyond the outer flanks of the end-cogs on said bar being cut away to form approximately half-spaces of gear-teeth.

2. A spur-gear wheel, there being in its rim and in the web adjacent to the rim an excision; a bar in said excision, and means for securing said bar in said excision, there being gear-teeth on opposite ends of said bar, said bar being adapted to be reversed in said excision whereby the teeth on one or the other end of said bar may be brought into spaced relation with the remaining gear-teeth in said spur-gear.

3. A mutilated gear-wheel having a rim and a web, there being in said rim and in the web adjacent to said rim an excision, a bar in said excision and means for removably retaining said bar in said excision; said bar having on its outer end a series of gear-teeth coinciding in pitch with that of the gear-teeth in said gear-wheel, said teeth in the bar forming a portion of the teeth in said gear-wheel when the bar is placed and locked in said excision.

4. In gearing, a mutilated spur-gear wheel and a pinion, said spur-gear having removable and reversible entrance teeth.

5. In gearing, a spur-gear wheel and a pinion, there being an opening in the web and rim of said wheel, and a removable and reversible tooth-section in said opening.

6. In gearing, a mutilated spur-gear and a pinion, there being an opening in the web and in the rim of said gear and a removable and reversible tooth-section in said opening.

7. In gearing, a spur-gear wheel and a pinion, there being an opening in the web and in the rim of said gear-wheel, said opening having a bridge, and a tooth-section in said opening and secured to said bridge.

8. In gearing, a mutilated gear-wheel there being an opening in its web and rim adjacent to the beginning of the tooth-section;

a bridge in said opening; a block in said opening having teeth on one end coinciding with the teeth of said gear-wheel and forming a continuation thereof, said block being recessed to engage the bridge, and a bolt passing through said bridge and the block to secure the latter within said opening.

9. A mutilated gear-wheel including a partly-toothed rim and a web, there being an opening in said web and the rim adjacent to the beginning of the tooth-portion of said rim, and a bridge in said opening; a block in said opening having gear-teeth on both of its ends, said gear-teeth being of the same pitch as the teeth on the gear-section, said block being recessed to engage said bridge, and a bolt passing through said bridge and centrally through said block.

10. In gearing, the combination, with a revolving cylinder-head, of shafts revolving in said head; pinions on one end of said shafts; a stationary spur-gear on the face of said cylinder-head provided with teeth on a portion of its periphery only, and a smooth section for the remainder thereof, there being a reversible tooth-section in said gear-wheel forming the beginning of said tooth-section.

11. In gearing, the combination, with a revolving cylinder-head, of shafts revolving in said head, pinions on one end of said shafts; a stationary, mutilated, spur-wheel, there being a peripherally-smooth section in said spur-wheel; a removable and reversible tooth-section in said spur-wheel forming the beginning of the tooth-section, and slides on the pinions adapted to engage the peripherally-smooth section.

In testimony that I claim the foregoing as my invention, I have hereunto set my hand in the presence of two subscribing witnesses.

RUDOLPH C. SCHERLING.

Attest:
MICHAEL J. STARK,
A. G. PETERSON.